United States Patent
Sun et al.

(10) Patent No.: US 12,508,246 B2
(45) Date of Patent: *Dec. 30, 2025

(54) USES OF COMPLEX OF ANGIOTENSIN II RECEPTOR ANTAGONIST METABOLITE AND NEP INHIBITOR IN TREATING HEART FAILURE

(71) Applicant: SHENZHEN SALUBRIS PHARMACEUTICALS CO. LTD, Guangdong (CN)

(72) Inventors: Jingchao Sun, Guangdong (CN); Xiaolong Jing, Guangdong (CN)

(73) Assignee: SHENZHEN SALUBRIS PHARMACEUTICALS CO. LTD., Guangdong (CN)

( * ) Notice: Subject to any disclaimer, the term of this patent is extended or adjusted under 35 U.S.C. 154(b) by 954 days.

This patent is subject to a terminal disclaimer.

(21) Appl. No.: 17/761,543

(22) PCT Filed: Sep. 18, 2020

(86) PCT No.: PCT/CN2020/116023
§ 371 (c)(1),
(2) Date: Mar. 17, 2022

(87) PCT Pub. No.: WO2021/052441
PCT Pub. Date: Mar. 25, 2021

(65) Prior Publication Data
US 2022/0395491 A1    Dec. 15, 2022

(30) Foreign Application Priority Data

Sep. 20, 2019 (CN) .......................... 201910890853.X
Sep. 1, 2020 (CN) .......................... 202010901984.6

(51) Int. Cl.
A61K 31/4178 (2006.01)
A61P 9/04 (2006.01)

(52) U.S. Cl.
CPC ............ *A61K 31/4178* (2013.01); *A61P 9/04* (2018.01)

(58) Field of Classification Search
CPC .............................. A61K 31/4178; A61P 9/04
See application file for complete search history.

(56) References Cited

U.S. PATENT DOCUMENTS

| | | | |
|---|---|---|---|
| 2012/0016172 A1 | 1/2012 | Miyazoe et al. | |
| 2013/0209505 A1 | 8/2013 | Rapta | |
| 2022/0226285 A1 | 7/2022 | Sun et al. | |

FOREIGN PATENT DOCUMENTS

| CN | 105503760 A | 4/2016 | |
|---|---|---|---|
| CN | 105669581 A | 6/2016 | |
| CN | 106138041 A | 11/2016 | |
| CN | 106146472 A | 11/2016 | |
| CN | 106924241 A | 7/2017 | |
| CN | 113286585 A | 8/2021 | |
| CN | 114173782 A | 3/2022 | |
| CN | 115443272 A | 12/2022 | |
| KR | 1020180114225 A | 10/2018 | |
| WO | 2007056546 A1 | 5/2007 | |
| WO | 2010113993 A1 | 10/2010 | |
| WO | 2016181284 A1 | 3/2015 | |
| WO | 2015028941 A1 | 11/2016 | |
| WO | 2017006254 A1 | 1/2017 | |
| WO | 2017125031 A1 | 7/2017 | |
| WO | 2017156009 A1 | 9/2017 | |
| WO | WO-2021052441 A1 * | 3/2021 | ........... A61K 31/216 |
| WO | WO-2022037512 A1 * | 2/2022 | |

OTHER PUBLICATIONS

International Search Report and Written Opinion in corresponding International Patent Application No. PCT/CN2020/116023, dated Dec. 16, 2020.
Taiwan Office Action in corresponding Taiwanese Patent Application No. TW202114652, dated Sep. 6, 2021 (machine translation).
Ma Lan, et al., "Angiotensin receptor and neprilysin inhibitor in the treatment of heart failure," World Clinical Drugs vol. 39 No. 9, Dec. 31, 2018, pages S37-S40.
Toshiaki Tamaki et al, EXP3174: "The Major Active Metabolite of Losartan," Cardiovascular Drug Reviews, vol. 15, No. 2, pp. 122-136.
Sun Jingchao et al., "Pharmacodynamic and pharmacokinetic effects of S086. a novel angiotensin receptor neprilysin inhibitor", Biomedicine & Pharmacotherapy, vol. 129, Jun. 20, 2020, 110410 (10 pages).
Zhang Jianqi et al. v "Effects of allisartan isoproxil on blood pressure and target organ injury in patients with mild to moderate essential hypertension," Medicine, vol. 98, No. 12, Mar. 31, 2019 (Mar. 31, 2019), pp. 1-10.
Ambrosy Andrew P. et al., "The role of angiotensin recepton-neprilysin inhibitors in cardiovacular disease—existing evidence knowledge gaps, and future directions," European Journal ofr heart Failure, vol. 20, Dec. 31, 2018 (Dec. 31, 2018), pp. 963-972.
Office Action of Indonesian Patent Application No. P00202204132, dated Nov. 21, 2023, 3 pages.
Ferrario, et al. "Renin angiotensin aldosterone inhibition in the treatment of cardiovascular disease", Pharmacological research, 2017, 125, pp. 57-71.
Jing, et al. "Progress in the application of angiotensin receptor antagonists in cardiovascular diseases." Chinese Journal of Hypertension, 2018, vol. 26, No. 4, 6 pages.

(Continued)

*Primary Examiner* — Kevin E Weddington
(74) *Attorney, Agent, or Firm* — Leason Ellis LLP

(57) ABSTRACT

Uses of a complex of an angiotensin II receptor antagonist metabolite and a NEP inhibitor in treating heart failure, specifically related are uses of complex in preparing a medicament for use in heart failure with reduced ejection fraction (HFrEF).

11 Claims, 1 Drawing Sheet

(56) References Cited

OTHER PUBLICATIONS

Tan, et al. "New progression in treatment of chronic heart failure—LCZ696", Adv. Cardiovasc. Diseases, 2016, 37(1): 42-45, 4 pages.
Yang, "Treatment of Heart Failure with Preserved Ejection Fraction." Chinese Journal of Clinicians, 2015, 9(21):3830-3832, 3 pages.
Indonesian Office Action mailed Jul. 3, 2025, for Application No. P002022041232. 3 pages.

\* cited by examiner

Table 1 Classification and Diagnostic Criteria of Heart Failure

| Diagnostic criteria | HFrEF | HFmrEF | HFpEF |
|---|---|---|---|
| 1 | Symptoms and/or signs | Symptoms and/or signs | Symptoms and/or signs |
| 2 | LVEF<40% | LVEF 40%-49% | LVEF≥50% |
| 3 |  | Elevated natriuretic peptide, and meeting at least one of the following: (l) left ventricular hypertrophy and/or left atrial enlargement, (2) abnormal diastolic function | Elevated natriuretic peptide, and meeting at least one of the following: (l) left ventricular hypertrophy and/or left atrial enlargement, (2) abnormal diastolic function |
| Remarks | Randomized clinical trials mainly include such patients, and effective treatments have been confirmed. | The clinical characteristics, pathophysiology, treatment and prognosis of such patients remain unclear. Listing this group separately will facilitate the conduct of related studies. | It is necessary to exclude that patient's symptoms are caused by non-heart diseases. Effective treatment remains unclear. |

Note: HFrEF is heart failure with reduced ejection fraction, HFmrEF is heart failure with mid-range ejection fraction, HFpEF is heart failure with preserved ejection fraction, and LVEF is left ventricular ejection fraction; elevated natriuretic peptide is defined as a B-type natriuretic peptide (BNP) >35 ng/L and/or N-terminal pro-B-type natriuretic peptide (NT-proBNP) > 125 ng/L; for measures of abnormal diastolic function, see the Transthoracic Echocardiogram section in the diagnosis and evaluation of heart failure.

USES OF COMPLEX OF ANGIOTENSIN II RECEPTOR ANTAGONIST METABOLITE AND NEP INHIBITOR IN TREATING HEART FAILURE

CROSS-REFERENCE TO RELATED PATENT APPLICATIONS

This application is a U.S. National Phase Application under 35 U.S.C. § 371 of International Patent Application No. PCT/CN2020/116023, filed Sep. 18, 2020, and claims the priority of Chinese Application No. 201910890853.X, filed Sep. 20, 2019 and Chinese Application No. 202010901984.6, filed Sep. 1, 2020, all of which are incorporated by reference in their entireties. The International Application was published on Mar. 25, 2021 as International Publication No. WO 2021/052441 A1.

TECHNICAL FIELD

The invention belongs to the technical field of medicinal use and relates to new uses of a complex of an angiotensin II receptor antagonist metabolite and an NEP inhibitor for heart failure, and specifically to the uses of the complex in preparing a medicament for use in heart failure with reduced ejection fraction (HFrEF).

BACKGROUND ART

Heart failure is a serious manifestation or late stage of various heart diseases, with high death and rehospitalization rates. In developed countries, the prevalence of heart failure is 1.5% to 2.0% and 0% in populations aged over 70 years. An epidemiological survey in 2003 showed that the prevalence of heart failure was 0.9% among adults aged 35 to 74 in China. With the aging of population in China, the incidence of chronic diseases such as coronary heart disease, hypertension, diabetes and obesity is increasing. Improved medical techniques have prolonged the survival period of patients with heart diseases, resulting in a continuous increase in the prevalence of heart failure in China. A survey of 10,714 hospitalized patients with heart failure in China showed that the mortality rates of patients with heart failure were 15.4%, 12.3% and 6.2% during hospitalization in 1980, 1990 and 2000, respectively, and that the main causes for death were left heart failure (59%), arrhythmia (13%) and sudden cardiac death (13%). The China-HF study showed that the fatality rate was 4.1% in hospitalized patients with heart failure.

WO2007056546A1 discloses a Valsartan-Sacubitril sodium salt complex (LCZ696) and the preparation method thereof. In 2017, it was approved for marketing in China under the trade name of Entresto® for heart failure.

Its molecular structure units are as follows:

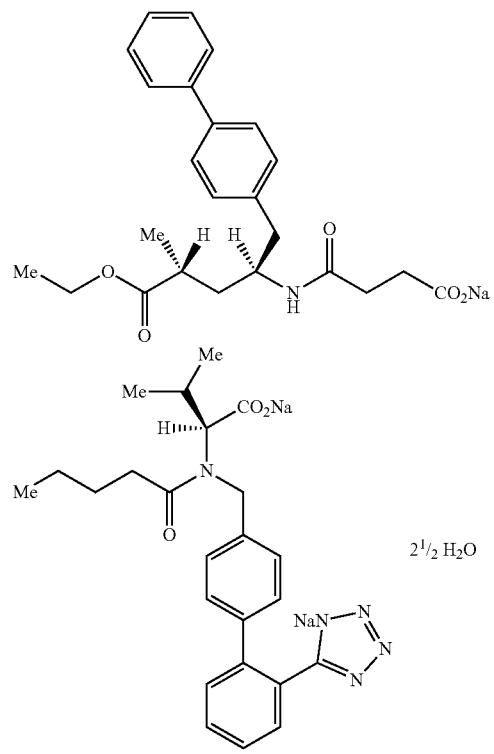

Also, WO2017125031A1 discloses a series of complexes of an angiotensin receptor antagonist metabolite (EXP3174) and an NEP inhibitor (Sacubitril) that exhibit certain effects on heart failure with preserved ejection fraction (HFpEF) and have the molecular structural units as follows:

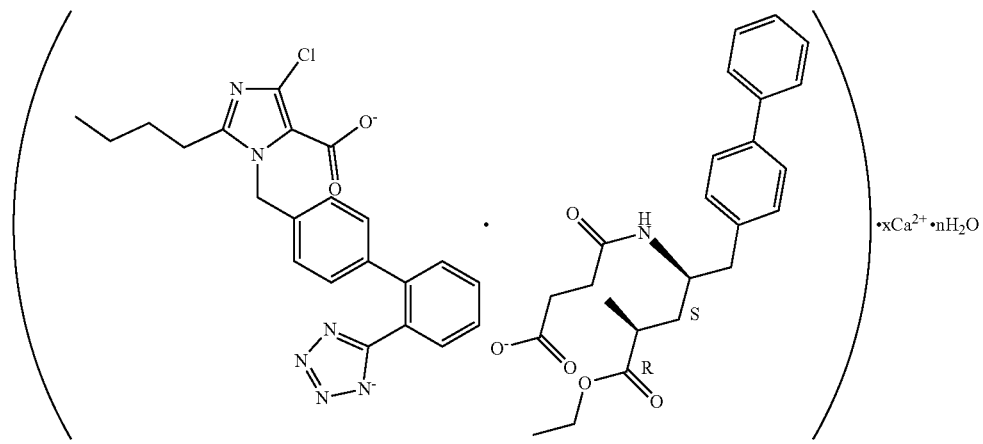

It can be seen that it is critical to find a targeted drug that has a good therapeutic effect for heart failure with reduced ejection fraction.

DESCRIPTION OF THE INVENTION

In view of the technical problems existing in the prior art, the invention provides uses of a complex of an angiotensin II receptor antagonist metabolite and an NEP inhibitor (or "a supramolecular complex") in preparing a medicament for use in heart failure with reduced ejection fraction. The complex has the structural units as follows:

(aEXP3174·bAHU377)·xCa·nA.

Specifically, the heart failure with reduced ejection fraction refers to HFrEF as defined in Table 1 of *Chinese Guidelines for the Diagnosis and Treatment of Heart Failure 2018*—Classification and Diagnostic Criteria of Heart Failure.

As a preferred technical solution of the invention, the medicament is used in patients suffering from heart failure with reduced ejection fraction. As inferred from the experimental results of the invention and the dose of prodrug used, a single-dose form of the medicament contains 60 mg to 500 mg of the complex calculated by the total mass of (aEXP3174·bAHU377), including but not limited to 60 mg, 70 mg, 80 mg, 90 mg, 100 mg, 110 mg, 120 mg, 130 mg, 140 mg, 150 mg, 160 mg, 170 mg, 180 mg, 190 mg, 200 mg, 210 mg, 220 mg, 230 mg, 240 mg, 250 mg, 260 mg, 270 mg, 280 mg, 290 mg, 300 mg, 310 mg, 320 mg, 330 mg, 340 mg, 350 mg, 360 mg, 370 mg, 380 mg, 390 mg, 400 mg, 410 mg, 420 mg, 430 mg, 440 mg, 450 mg, 460 mg, 470 mg, 480 mg, 490 mg and 500 mg.

As a more preferred technical solution of the invention, a single-dose form of the medicament contains 60, 120, 180, 240, 300, 360, 420 and 480 mg of the complex.

In one embodiment, a single-dose form refers to the daily dosage form. Patients are administered with a dose containing 60 mg/d to 500 mg/d of the complex, and the dosing frequencies include but are not limited to once a day, twice a day, 3 times a day, 4 times a day and so on. The dose refers to the initial dose or maintenance dose of the drug use. In the use for hypertension, the initial dose is usually lower than the maintenance dose. The dose may be appropriately increased in patients with refractory hypertension in special conditions.

Specifically, the calculation method includes calculating according to the daily dose of prodrug. EXP3174 is the metabolite of allisartan isoproxil in the body that has been on the market with the generic name of Allisartan Isoproxil Tablets and the trade name of Xinlitan, and is dosed at 240 mg daily.

Allisartan isoproxil has the molecular formula of $C_{27}H_{29}ClN_6O_5$ and the molecular weight of 553.0; EXP3174 has the molecular formula of $C_{22}H_{21}ClN_6O_2$ and the molecular weight of about 436.9; AHU377 has the molecular formula of $C_{24}H_{29}NO_5$ and the molecular weight of about 411.5. The daily dose of the complex should be equivalent to that of allisartan isoproxil. Therefore, the single-dose form of the aforementioned complex is obtained by calculation.

Based on the data from the canine heart failure model with decreased ejection fraction, it is inferred that the effective dose is 100 mg/d in humans with the dose range of 60 mg/d to 500 mg/d.

The medicament is a solid composition for oral administration, preferably the composition is tablet or capsule, which can be administered in multiple tablets and multiple capsules with a total dose of 60 mg to 500 mg.

The complex of the medicament can be obtained by a method known in the prior art, wherein the complex and the preparation method thereof disclosed in WO2017125031A1 are incorporated into the invention.

As a more preferred technical solution of the invention, the value of a:b is selected from 1:0.25, 1:0.5, 1:1, 1:1.5, 1:2, 1:2.5, 1:3, 1:3.5 and 1:4.

As a more preferred technical solution of the invention, the complex has the structural units as follows:

EXP3174·AHU377)·xCa·nH$_2$O

Or

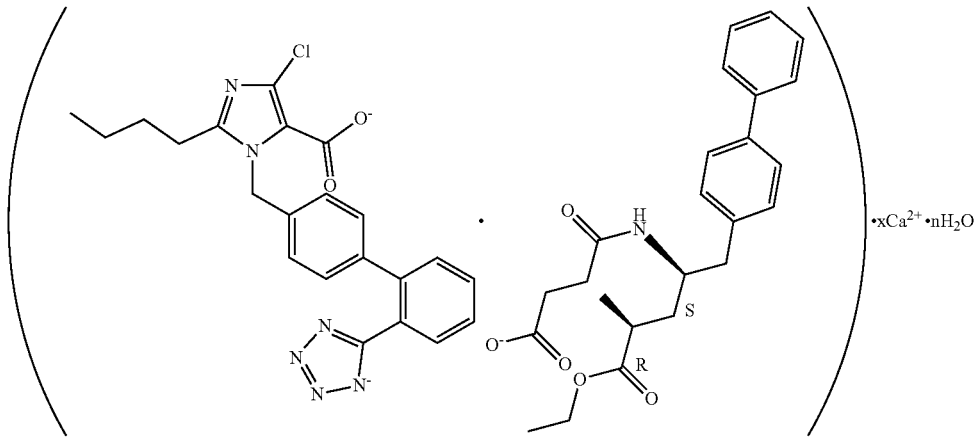

Where x is a value between 0.5 and 2, and n is a value between 0 and 3.

As a more preferred technical solution of the invention, x is selected from 0.5, 1, 1.5 and 2.

As a more preferred technical solution of the invention, the complex has the structural units as follows:

(EX3174·AHU1377)·1.5Ca·$n$H$_2$O

Or

EXP3174·AHU377)·2Ca·$n$H$_2$O

Where n is any value between 1 and 3.

As a more preferred technical solution of the invention, n is selected from 0.5, 1, 1.5, 2, 2.5 and 3.

As a more preferred technical solution of the invention, the complex is selected from:

(EX3174·AHU1377)·1.5Ca·1H$_2$O:

(EX3174·AHU1377)·1.5Ca·1.5H$_2$O:

(EX3174·AHU1377)·1.5Ca·2H$_2$O:

(EX3174·AHU1377)·1.5Ca·2.5H$_2$O:

(EX3174·AHU1377)·1.5Ca·3H$_2$O:

(EX3174·AHU1377)·2Ca·1H$_2$O:

(EX3174·AHU1377)·2Ca·1.5H$_2$O:

(EX3174·AHU1377)·2Ca·2H$_2$O:

(EX3174·AHU1377)·2Ca·2.5H$_2$O:

(EX3174·AHU1377)·2Ca·2.5H$_2$O.

Those skilled in the art can understand that in the unit cell of a supramolecular complex, the allisartan isoproxil metabolite (EXP3174), AHU377, calcium ion (Ca$^{2+}$) and solvent molecules will be filled therein in the form of a plurality of structural units.

The supramolecular complex of the invention is different from a mixture obtained by simple physical mixing of two active ingredients. The XRD spectrum of the obtained supramolecular complex is distinctly different from that of EXP3174 and AHU377 calcium salt, and its solubility is also significantly different in various solvents (such as water, ethanol, ethanol-water, etc.). There are also significant differences in other physical and chemical properties such as hygroscopicity, melting point, infrared spectrum, etc.

Compared with the prior art, the invention has the following advantages and beneficial effects:

1. The invention provides uses of a series of supramolecular complexes with the dual effects of allisartan isoproxil metabolite (EXP3174) and enkephalinase inhibitor (AHU377) in heart failure with reduced ejection fraction, which have a significantly better effect than LCZ696 does at the same dose;
2. The complex of the invention in a dog model with reduced ejection fraction has a better effect than that in a dog model with preserved ejection fraction. It can be seen that the pharmaceutical composition of the invention has specific selectivity for heart failure with reduced ejection fraction, which is difficult to predict based on the prior art.
3. The complex of the invention has a better effect than the physical mixture of EXP3174+AHU377, fully demonstrating that use of the complex has significant advantages over the use of a physical combination of drugs.

DESCRIPTION OF THE DRAWINGS

FIG. 1 *Chinese Guidelines for the Diagnosis and Treatment of Heart Failure* 2018-Classification and Diagnostic Criteria of Heart Failure Table.

SPECIFIC EMBODIMENTS

The invention will now be described in further details with reference to examples and drawings, but the embodiments of the invention are not limited thereto.

In the following examples:

An Empyrean X-ray diffractometer was employed for X-ray powder diffraction detection. The detection conditions: Cu target Kα ray, voltage 40 KV, current 40 mA, emission slit 1/32°, anti-scatter slit 1/16°, anti-scatter slit 7.5 mm, 2θ range 3°-60°, step length 0.02°, and residence time per step 40 s.

DSC204F1 differential scanning calorimeter from NETZSCH, Germany was employed to detect differential scanning calorimetry spectra. Detection conditions: atmosphere: N$_2$, 20 mL/min; scanning procedure: recording the heating curve by increasing the temperature from room temperature at 10° C./min to 250° C.

TG209 thermogravimetric analyzer from NETZSCH, Germany was employed to detect the moisture content. Detection conditions: atmosphere: N$_2$, 20 mL/min; scanning procedure: room temperature to 700° C., heating rate: 10° C./min.

EXP3174 used in the examples was self-made by the company, with a purity of 98.3%. AHU377 calcium salt used in the examples was self-made by the company, with a purity of 99.4%.

Example 1

Preparation of AHU377 Free Acid:

A 250 mL single-necked flask was added with 2.1 g of AHU377 calcium salt and 40 mL of isopropyl acetate, and then added with 4.5 mL of 2 mol/L hydrochloric acid at room temperature and stirred to dissolve. The liquids were separated to collect the organic layer that was washed twice with 20 mL of water; after precipitated under reduced pressure at 35° C., it provided AHU377 free acid.

Example 2

Preparation of the Complex: (Prepared According to Example 2 of Patent WO2017125031A1)

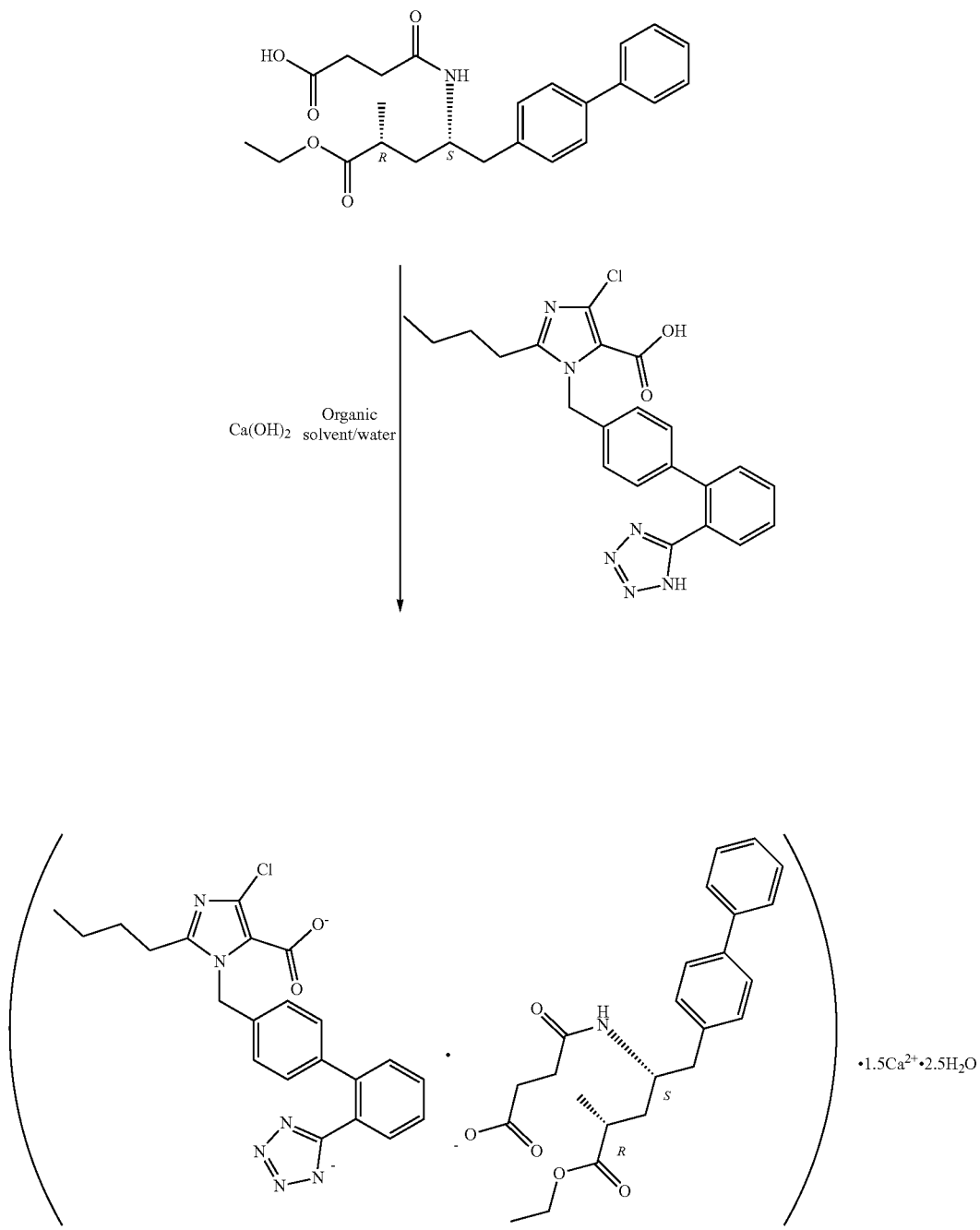

At room temperature, 2.36 g of AHU377 free acid, 2 g of EXP3174 and 40 mL of acetone obtained according to the method in Example 1 were added into a 250 mL three-necked flask, and dissolved; 1.3 equivalents of calcium hydroxide solid to AHU377 and 1 mL of water were added at room temperature, stirred at room temperature for 10 h and added with 40 mL more of acetone to react for another 8 hours. Under nitrogen protection, it was filtered by a Buchner funnel. The solid was rinsed with acetone to provide a white solid that was vacuum dried at 35° C. for 8 h and dried to provide 3.5 g of solid (EXP3174·AHU377)$^{3-}$·1.5Ca$^{2+}$·2.5H$_2$O, with a purity of 99% as determined by HPLC. The test was repeated to obtain sufficient doses for pharmacodynamic experiments.

Example 3

Preparation of the Complex: (Prepared According to Example 3 of Patent WO2017125031A1)

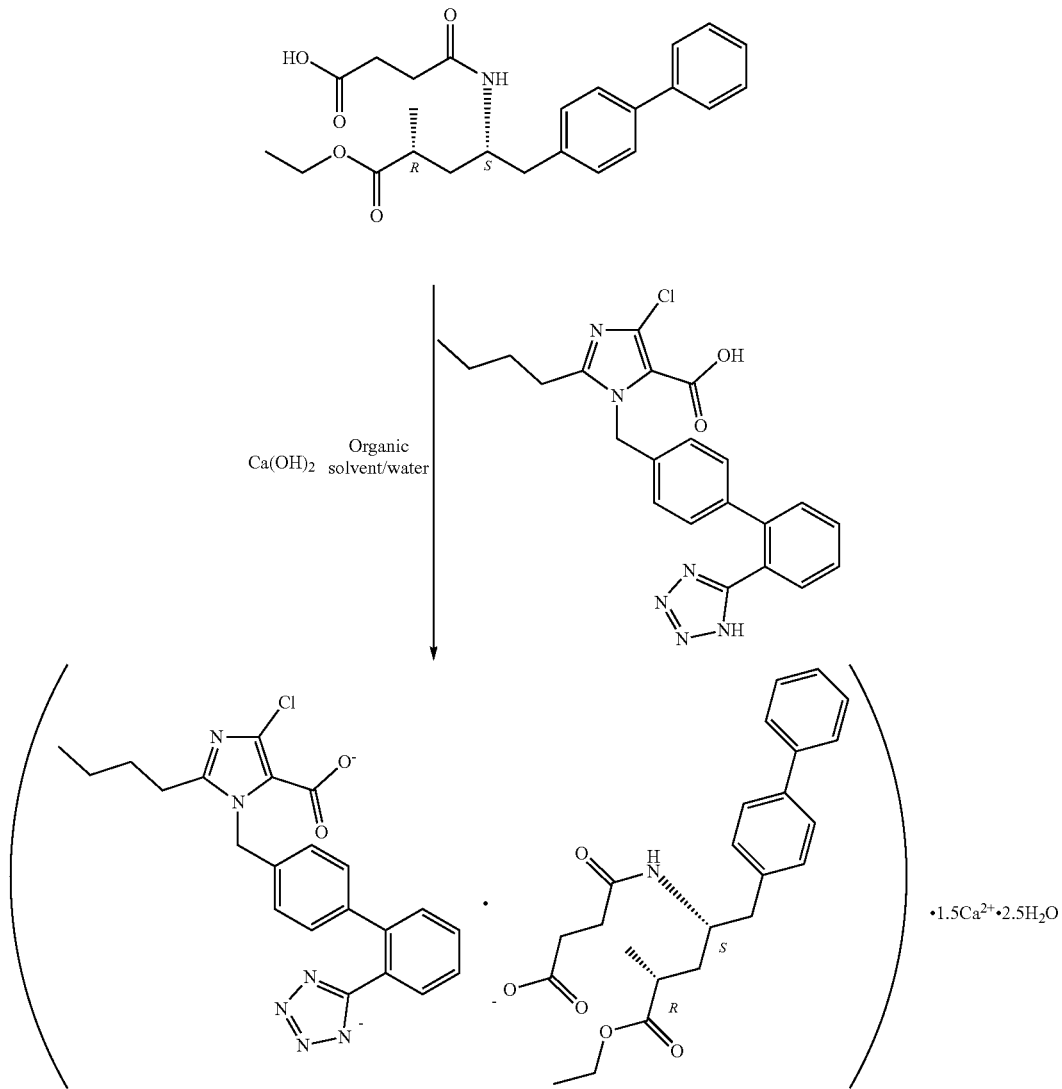

At room temperature, 2.36 g of AHU377 free acid, 2 g of EXP3174 and 40 mL of acetone obtained according to the method in Example 1 were added into a 250 mL three-necked flask, and dissolved; 1.6 equivalents of calcium hydroxide solid to AHU377 and 0.6 mL of water were added at room temperature, stirred for 6 h at 35° C. and added with 40 mL more of acetone to react for another 8 hours. Under nitrogen protection, it was filtered by a Buchner funnel. The solid was rinsed with acetone to provide a white solid that was vacuum dried at 50° C. for 8 h and dried to provide 3.1 g of solid (EXP3174·AHU377)$^{3-}$·1.5 Ca$^{2+}$·2H$_2$O. The test was repeated to obtain sufficient doses for pharmacodynamic experiments.

Example 4

A Pharmacodynamic Study on the Complex in the Canine Chronic Heart Failure Model-Reduced Ejection Fraction 4.1 Methods: After the animals arrived at the facility, they were on adaptive feeding, and randomized after echocardiography and ECG, and then the experiment was started. On the day of operation, animals were anesthetized by intramuscular injection of Zoletil (5 mg/kg). The trachea of the anesthetized dogs were connected to the ventilator, and then they were fixed in a supine position, their chest was opened between the third and fourth ribs, the left anterior descending coronary artery was ligated to close the thoracic cavity, and then the skin was sutured. After the animals recovered for 3 days after operation, they were given therapeutic drugs by gavage, once a day for four consecutive weeks. During the experiment, animal's living conditions were observed every day, and their abnormal conditions were recorded. After 42 days of dosing, echocardiography was performed.

4.2 Modeling: On the day before operation, the animals were fasted overnight. On the day of operation, the animals were intramuscularly injected with Zoletil (dose: 5 mg/kg) to induce anesthesia, and also were intramuscularly administered with atropine sulfate injection (dose: 0.5 mg/dog). After the animals were anesthetized, their hair on the left chest was shaved clean. Tracheal intubation was quickly performed to connect to the ventilator to provide artificial respiration and provide 1.5% isoflurane gas to maintain the anesthesia state, and also a monitor was used to monitor blood oxygen saturation, heart rate, electrocardiogram, body temperature and respiratory rate, etc. After the skin of the forelimbs was disinfected with 70% alcohol, the cephalic veins were found for intravenous intubation and indwelling intravenously as the dosing access. Iodophor and 70% alcohol were used to sterilize the left chest skin as the aseptic treatment. A sterile surgical drape hole towel was spread. A sterile scalpel was used to cut the skin along the fourth and fifth intercostal space, and after hemostasis, an electric knife was used to cut open the subcutaneous tissues layer by layer and muscular layers, and bleeding was stopped in a timely manner. The pleural membrane was carefully opened to expose the lung tissues, avoiding damage to the lung tissues; the surgical field of view was gradually expanded to 20-25 cm along the lower edge of the fourth rib, and a chest expander was used to expand the surgical window. A sterile gauze soaked in warm normal saline was used to push and protect the lung tissues. A sterile gauze soaked in warm normal saline was used to push the left atrial appendage to expose it between the left ventricle and the left atrium, and a blunt right-angle forceps was used to separate the left anterior descending coronary artery. A 4 #silk thread was used to pass through the artery, avoiding pulling the artery during the separating and threading. A silk thread was used to ligate the left anterior descending coronary artery. During the ligation, the animals were closely observed for blood oxygen saturation, heart rate, electrocardiogram, body temperature and respiratory rate. If an animal had abnormalities such as ventricular fibrillation, the operation would be stopped immediately and lidocaine injection (10 mg/kg) would be quickly administered via cephalic veins for treatment. After it was confirmed to have no bleeding in the thoracic cavity, the protective gauze was removed. A 7 #suture was used to pass through the fourth and fifth ribs to suture the thoracic cavity. The manual compression method was used to recruit lungs. The tissue and skin were sutured layer by layer. After operation, the animals were kept warm and properly replenished with physiological saline, and were closely observed for blood oxygen saturation, heart rate, electrocardiogram, body temperature and respiratory changes; the gas anesthesia machine was turned off, and the tracheal intubation was removed until the animals fully recovered their spontaneous respiration. After operation, a pain-killer (meloxicam, 0.67 mg/kg) was intramuscularly injected for pain relief, and ampicillin sodium 20 mg/kg was intramuscularly injected for anti-infection.

4.3 Groups and administration: Before grouping, each dog received echocardiography and ECG monitoring. According to ejection fraction, the dogs were randomized into 5 groups (4-6 animals in each group). Three days after animal modeling, the dogs in each group were given corresponding drugs by gavage once a day for 6 weeks. All operations were performed in 6 batches for the experiment, with 4-5 animals in each batch and 0-1 animal in each group. Information about each group is shown in Table 1:

TABLE 1

| Group No. | Group | Number of animals | Dose given | Dosing frequency | Duration |
|---|---|---|---|---|---|
| 1 | Sham | 4 | — | p.o qd | 3 d after modeling for 6 weeks |
| 2 | Model | 5 | — | p.o qd | 3 d after modeling for 6 weeks |
| 3 | Positive drug (LCZ696) | 6 | 100 mg/kg | p.o qd | 3 d after modeling for 6 weeks |
| 4 | EXP3174 + sacubitril calcium salt physical mix | 6 | EXP3174 52 mpk + Sacubitril 48 mpk | p.o qd | 3 d after modeling for 6 weeks |
| 5 | Complex of the invention | 6 | 100 mg/kg | p.o qd | 3 d after modeling for 6 weeks |

Note:
All doses are given based on anhydrous free acid, and the compound obtained in Example 3 is used as the complex of the invention.

4.4 Experimental results: An important manifestation of chronic heart failure is reduced left ventricular systolic function, which is the primary endpoint for clinical detection of chronic heart failure. Echocardiography showed that the left ventricular ejection fraction (LVEF) was significantly reduced (<40%) in the dogs of the model group after modeling, with a P value less than 0.001 as compared with the sham group, which could better simulate the chronic heart failure with reduced clinical ejection fraction. Table 2 showed that the endpoint LVEF of dogs was 46.45% in the LCZ696 group, which was significantly higher than that in the model group (P<0.001). LVEF could be increased by both the complex of the invention and the physical mixture, which was statistically significant compared with that in the model group (P<0.001). Also, the 100 mpk (mg/kg) of the complex of the invention and the equimolar dose of LCZ696 had better effects on LVEF. The details are shown in the table below:

TABLE 2

Effects of compounds on the endpoint-left ventricular ejection fraction in dogs with heart failure (Mean ± SD)

| Group | Number | LVEF (%) |
|---|---|---|
| Sham | 4 | 66.20 ± 2.83 |
| Model | 5 | 35.82 ± 2.02### |
| LCZ696, 100 mpk | 6 | 46.45 ± 3.39*** |
| EXP3174 + sacubitril calcium salt physical mix | 6 | 46.34 ± 2.59*** |
| Complex of the invention, 100 mpk | 6 | 51.87 ± 1.01***@$ |

Among them, model LVEF is 35.82% (<40%), indicating that the ejection fraction is reduced and the modeling is successful, as shown in FIG. 1.

P<0.001, compared with sham group; *P<0.05, P<0.01, *P<0.001, compared with model group; @P<0.05, compared with physical mixture; $P<0.05, compared with LCZ696 group.

Note: The compound obtained in Example 3 is used as the complex of the invention. It can be seen from the above results that the supramolecular complexes with dual effects provided by the invention are used as the medicament in heart failure with reduced ejection fraction, which have a significantly better effect at the same dose than 100 mpk of LCZ696.

The complex of the invention has a better effect than the physical mixture of EXP3174+AHU377, fully demonstrating that use of the complex has significant advantages over the use of a physical combination of drugs.

Example 5

A Pharmacodynamic Study on the Complex in the Canine Chronic Heart Failure Model-Preserved Ejection Fraction 5.1 Methods: After the animals arrived at the facility, they were on adaptive feeding, and randomized after echocardiography and ECG, and then the experiment was started. On the day of operation, animals were anesthetized by intramuscular injection of Zoletil (5 mg/kg). The tracheae of the anesthetized dogs were connected to the ventilator, and then they were fixed in a supine position; their chests were opened between the third and fourth ribs, the left anterior descending coronary artery was ligated to close the thoracic cavity, and then the skin was sutured. After the animals recovered for 3 days after operation, they were given therapeutic drugs by gavage, once a day for two consecutive weeks. During the experiment, the animals' living conditions were observed every day, and their abnormal conditions were recorded. After 14 days of dosing, echocardiography was performed.

5.2 Modeling: On the day before operation, the animals were fasted overnight. On the day of operation, the animals were intramuscularly injected with Zoletil (dose: 5 mg/kg) to induce anesthesia, and also were intramuscularly administered with atropine sulfate injection (dose: 0.5 mg/dog). After the animals were anesthetized, their hair on the left chest was shaved clean. Tracheal intubation was quickly performed to connect to the ventilator to provide artificial respiration and provide 1.5% isoflurane gas to maintain the anesthesia state, and also a monitor was used to monitor blood oxygen saturation, heart rate, electrocardiogram, body temperature and respiratory rate, etc. After the skin of the forelimbs was disinfected with 70% alcohol, the cephalic veins were found for intravenous intubation and indwelling intravenously as the dosing access. Iodophor and 70% alcohol were used to sterilize the left chest skin as the aseptic treatment. A sterile surgical drape hole towel was spread. A sterile scalpel was used to cut the skin along the fourth and fifth intercostal space, and after hemostasis, an electric knife was used to cut open the subcutaneous tissues layer by layer and muscular layers, and bleeding was stopped in a timely manner. The pleural membrane was carefully opened to expose the lung tissues, avoiding damage to the lung tissues; the surgical field of view was gradually expanded to 20-25 cm along the lower edge of the fourth rib, and a chest expander was used to expand the surgical window. A sterile gauze soaked in warm normal saline was used to push and protect the lung tissues. A sterile gauze soaked in warm normal saline was used to push the left atrial appendage to expose it between the left ventricle and the left atrium, and a blunt right-angle forceps was used to separate the left anterior descending coronary artery. A 4 #silk thread was used to pass through the artery, avoiding pulling the artery during the separating and threading. A silk thread was used to ligate the left anterior descending coronary artery. During the ligation, the animals were closely observed for blood oxygen saturation, heart rate, electrocardiogram, body temperature and respiratory rate. If an animal had abnormalities such as ventricular fibrillation, the operation would be stopped immediately and lidocaine injection (10 mg/kg) would be quickly administered via cephalic veins for treatment. After it was confirmed to have no bleeding in the thoracic cavity, the protective gauze was removed. A 7 #suture was used to pass through the fourth and fifth ribs to suture the thoracic cavity. The manual compression method was used to recruit lungs. The tissue and skin were sutured layer by layer. After operation, the animals were kept warm and properly replenished with physiological saline, and were closely observed for blood oxygen saturation, heart rate, electrocardiogram, body temperature and respiratory changes; the gas anesthesia machine was turned off, and the tracheal intubation was removed until the animals fully recovered their spontaneous respiration. After operation, a pain-killer (meloxicam, 0.67 mg/kg) was intramuscularly injected for pain relief, and ampicillin sodium 20 mg/kg was intramuscularly injected for anti-infection.

5.3 Groups and administration: Before grouping, each dog received echocardiography and ECG monitoring. According to ejection fraction, the dogs were randomized into 5 groups (5-6 animals in each group). Three days after animal modeling, the dogs in each group were given corresponding drugs by gavage once a day for 2 weeks. All operations were performed in 6 batches for the experiment, with 4-5 animals in each batch and 0-1 animal in each group. Information about each group is shown in Table 3:

TABLE 3

| Group No. | Group | Number of animals | Dose given | Dosing frequency | Duration |
| --- | --- | --- | --- | --- | --- |
| 1 | Sham | 5 | — | p.o qd | 3 d after modeling for 2 weeks |
| 2 | Model | 5 | — | p.o qd | 3 d after modeling for 2 weeks |
| 3 | Positive drug (LCZ696) | 6 | 100 mpk | p.o qd | 3 d after modeling for 2 weeks |
| 4 | EXP3174 + sacubitril calcium salt physical mix | 6 | EXP3174 52 mpk + sacubitril 48 mpk | p.o qd | 3 d after modeling for 2 weeks |
| 5 | Complex of the invention | 6 | 100 mpk | p.o qd | 3 d after modeling for 2 weeks |

Note:
All doses are given based on anhydrous free acid, and the compound obtained in Example 3 is used as the complex of the invention.

5.4 Experimental results: An important manifestation of chronic heart failure is reduced left ventricular systolic function, which is the primary endpoint for clinical detection of chronic heart failure. Echocardiography showed that the left ventricular ejection fraction (LVEF) was significantly reduced but still higher than 50% in the dogs of the model group after modeling, with a P value less than 0.001 as compared with the sham group, which could better simulate the chronic heart failure with preserved clinical ejection fraction. Table 4 showed that the endpoint LVEF of dogs was 57.98% in the LCZ696 group, which was significantly higher than that in the model group (P<0.001). LVEF could be increased by both the complex of the invention and the physical mixture, which was statistically significant compared with that in the model group (P<0.05). Also, the 100 mg/kg of the complex of the invention and the equimolar dose of LCZ696 had better effects on LVEF and significantly better effects than those in the physical mixture group. The experimental results are shown in Table 4.

TABLE 4

Effects of compounds on the endpoint-left ventricular ejection fraction in dogs with heart failure (Mean ± SD)

| Group | Number | LVEF (%) |
| --- | --- | --- |
| Sham | 4 | 68.15 ± 1.89 |
| Model | 5 | 51.80 ± 0.80### |
| LCZ696, 100 mpk | 6 | 57.98 ± 2.64** |
| EXP3174 + sacubitril calcium salt physical mix | 6 | 55.18 ± 2.96* |
| Complex of the invention, 100 mpk | 6 | 58.04 ± 1.29***@ |

Among them, model LVEF is 51.80% (50%), indicating that the ejection fraction is preserved and the modeling is successful, as shown in FIG. 1.

P<0.001, compared with the sham group; *P<0.05, P<0.01, *P<0.001, compared with the model group; @P<0.05, compared with the physical mixture Note: The compound obtained in Example 3 is used as the complex of the invention. The above results show that the complex of the invention in a dog model with reduced ejection fraction has a better effect than that in a dog model with preserved ejection fraction. It can be seen that the pharmaceutical composition of the invention has specific selectivity for heart failure with reduced ejection fraction, which is difficult to predict based on the prior art.

The above-mentioned examples are the preferred embodiments of the invention, but the embodiments of the invention are not limited by the above-mentioned embodiments. Any other changes, modifications, substitutions, combinations and simplifications made without departing from the spirit and principle of the invention shall be equivalent replacement methods and be within the scope covered by the invention.

The invention claimed is:

1. A method of treating heart failure with reduced ejection fraction in a subject, the method comprising administering a composition to the subject, wherein the composition comprises a complex having the structural units as follows:

$$(aEXP3174 \cdot bAHU377) \cdot xCa \cdot nA$$

where a:b=1:0.25-4; x is a value between 0.5 and 3; A refers to water, methanol, ethanol, 2-propanol, acetone, ethyl acetate, methyl-tert-butyl ether, acetonitrile, toluene, or dichloromethane; and n is a value between 0 and 3, wherein the subject has heart failure with reduced ejection fraction.

2. The method of claim 1, wherein a single dose form of the composition contains 60 mg to 500 mg of the complex.

3. The method of claim 1, wherein a single-dose form of the composition contains 60, 120, 180, 240, 300, 360, 420 and 480 mg of the complex.

4. The method of claim 1, wherein the composition is a solid composition for oral administration.

5. The method of claim 1, wherein the value of a: b is selected from 1:0.25, 1:0.5, 1:1, 1:1.5, 1:2, 1:2.5, 1:3, 1:3.5 and 1:4.

6. The method of claim 1, wherein the complex has the structural units as follows:

$$(EXP3174 \cdot AHU377) \cdot xCa \cdot nH_2O$$

or

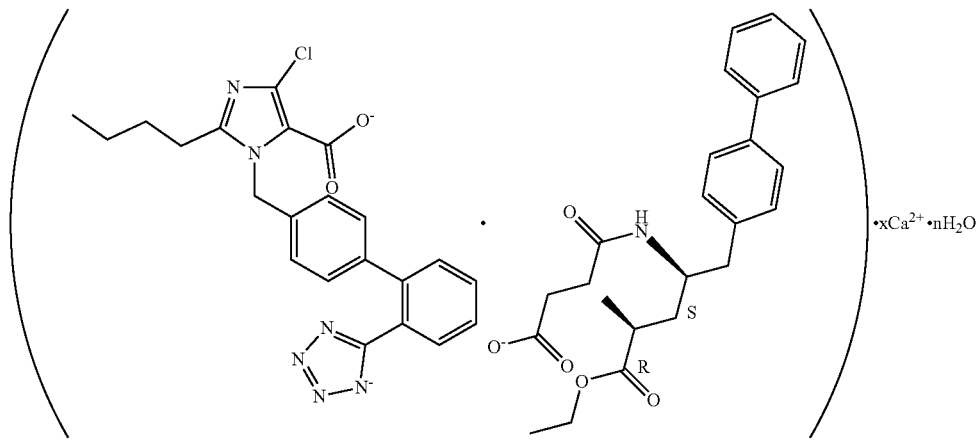

where x is a value between 0.5 and 2; and n is a value between 0 and 3.

7. The method of claim 1, wherein x is selected from 0.5, 1, 1.5 and 2.

8. The method of claim 1, wherein the complex has the structural units as follows:

(EXP3174·AHU377)·1.5Ca·$n$H$_2$O or (EXP3174·AHU377)·2Ca·$n$H$_2$O where n is any value between 1 and 3.

9. The method of claim 1, wherein n is selected from 0.5, 1, 1.5, 2, 2.5 and 3.

10. The method of claim 1, wherein the complex is selected from:

(EXP3174·AHU377)·1.5Ca·1H$_2$O (EXP3174·AHU377)·1.5Ca·1.5H$_2$O (EXP3174·AHU377)·1.5Ca·2H$_2$O (EXP3174·AHU377)·1.5Ca·2.5H$_2$O (EXP3174·AHU377)·1.5Ca·3H$_2$O (EXP3174·AHU377)·2Ca·1H$_2$O (EXP3174·AHU377)·2Ca·1.5H$_2$O (EXP3174·AHU377)·2Ca·2H$_2$O (EXP3174·AHU377)·2Ca·2.5H$_2$O

EXP3174·AHU377)·2Ca·3H$_2$O.

11. The method of claim 4, wherein the solid composition is a tablet or capsule.

* * * * *